Oct. 25, 1932.    E. MARLEY    1,884,041
TANK WASHING MACHINE
Filed Oct. 16, 1929    2 Sheets-Sheet 1

INVENTOR
EDWARD MARLEY
BY
ATTORNEY

Patented Oct. 25, 1932

1,884,041

UNITED STATES PATENT OFFICE

EDWARD MARLEY, OF NEW YORK, N. Y., ASSIGNOR TO STANDARD SHIPPING COMPANY

TANK WASHING MACHINE

Application filed October 16, 1929. Serial No. 399,895.

Figure 1:
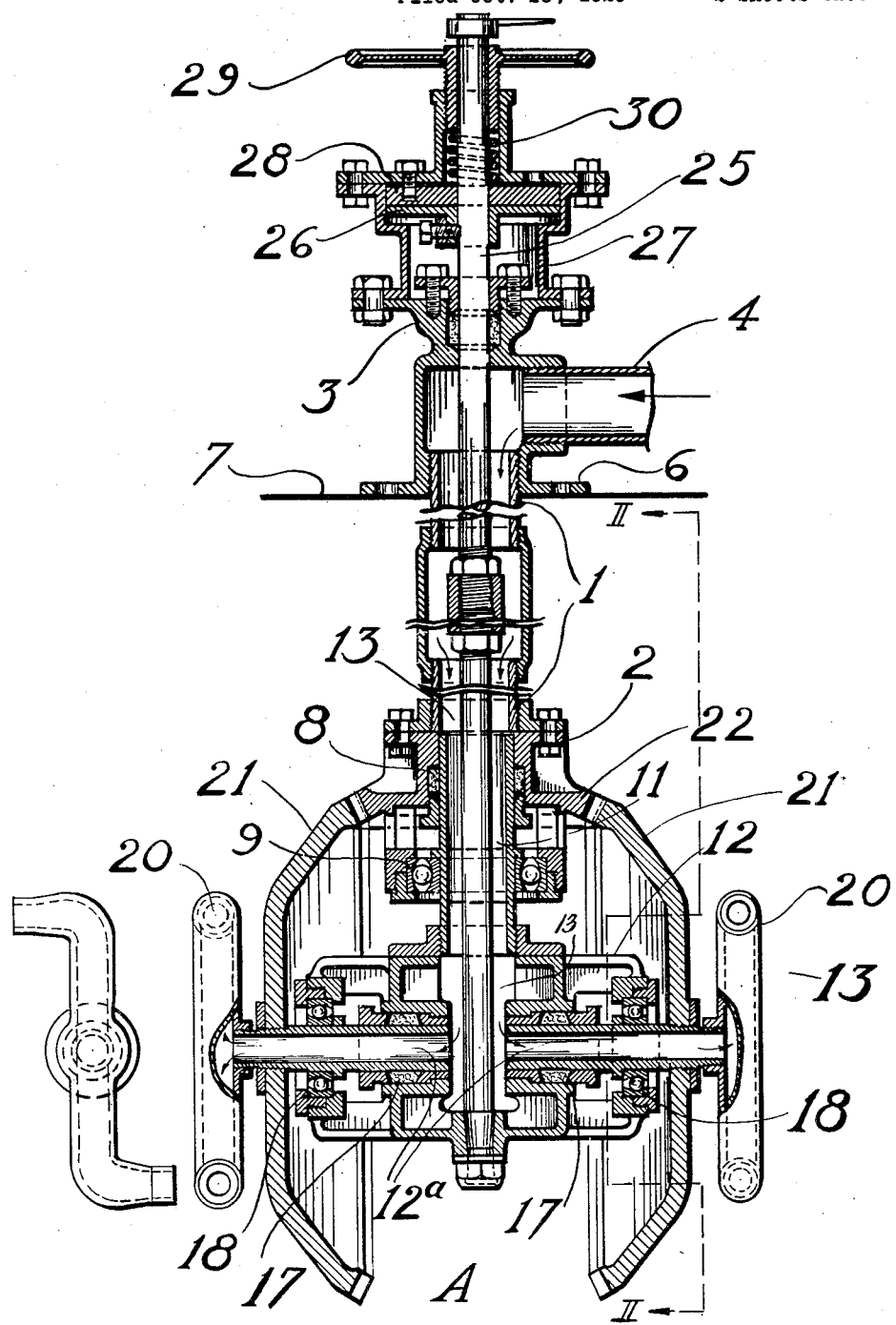
Figure 2:
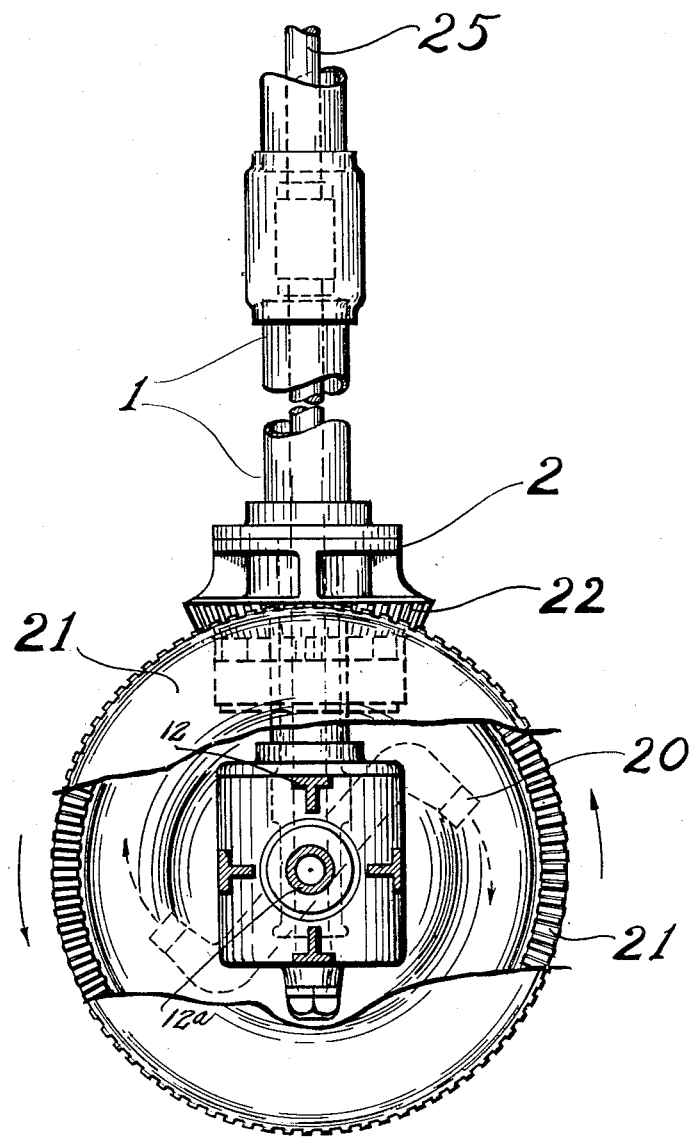

This invention relates to a cleansing device and has for its object to provide a simple device for efficiently cleansing the interior of receptacles such as tank ships and tank cars, which are used for transporting various grades of petroleum and edible oils and other materials. Other objects will be apparent from the specification and from the accompanying drawings in which latter Fig. 1 is a vertical section through a cleansing device, Fig. 2 is a section taken along the line 2—2 of Fig. 1.

Referring particularly to the drawings, the device comprises a tube 1 which carries rotatably a distributing assembly A by means of a coupling 2. The tube 1 is connected to a yoke 3 and has fluid communication therethrough with a conduit 4 which is adapted to be connected to any suitable source of liquid supply. A bracket 6 associated with the yoke 3 is adapted to be supported by the deck 7 of a tank ship, dome of tank car, or the like with the tube projecting into the tank or car. A packing 8 prevents leakage of fluid at the connection between the distributing assembly and the tube and anti-friction bearings 9 are provided at this connection.

The distributing assembly comprises a pipe 11 which is non-rotatably secured to a housing 12. The pipe 11 has fluid communication with the tube 1 and with the passageway 13 in the housing 12. T-shaped nipples 12a communicate with the passageway 13 and the bases thereof are rotatably supported in the housing 12. Packing 17 prevents leakage of liquid from this connection and anti-friction bearings 18 are provided.

The bases of the T-shaped nipples extend preferably at substantially right angles to the longitudinal axis of the tube 1. The discharge ends of the nipples are provided with angularly disposed nozzles 20 which face in opposite directions and in the preferred embodiment at substantially right angles to the longitudinal axis of the base of the nipples. The nozzles are rifled in order to eject the liquid as a solid body. Rotation of the nipples about the longitudinal axis of their bases is effected by the reactionary force of the issuing jets of liquid. The nipples carry bevel pinions 21 non-rotatably with respect thereto, which engage a fixed bevel pinion 22 non-rotatably carried by the coupling 2. The pinions 21 are substantially larger than the pinion 22 with the result that the rate of revolutions of the nozzles 20 in a vertical plane is about one-half of the rate of revolutions of the assembly in a horizontal plane. If desired the ratio of the rate of revolutions between the horizontal and vertical planes can be altered by means of an epicyclic gear, not shown. The pinions 21 are provided with a different number of teeth than is the pinion 22. As a result of this structure the jets of liquid issuing from the nozzles describe a spherical cyclical path during successive revolutions.

Braking mechanism is provided for controlling the rate of revolution of the distributing assembly. The braking mechanism comprises a rod or a member 25 which is non-rotatably associated with the housing 12, and passes through the tube 1 and yoke 3, projecting beyond the latter. A friction disc 26 is non-rotatably carried by the rod 25, and is disposed within a housing 27 upon the yoke 3. The housing carries non-rotatably a friction brake disc 28.

Frictional contact between the discs 26 and 28 is controlled manually by the handwheel 29 operating through a spring 30.

In utilizing the device, liquid such as water or other cleansing solution at a suitable temperature and pressure, is introduced through conduit 4 and tube 1 into the distributing assembly, issuing therefrom through nozzles 20. The energy of the velocity of the liquid issuing from the nozzles effects rotation of the nipples about an axis in a plane substantially at right angles to the longitudinal axis of the tube 1. During this rotation of the nipples, the engagement of the pinions 21 and 22 causes rotation of the entire distributing assembly about the longitudinal axis of the tube 1 at rate of revolutions about twice that of the revolutions of the nipples with respect to the assembly. The hand-wheel 29 is actuated manually from the outside of the receptacle to control the rate of revolution of the distributing assembly.

By the construction described, positive control of the speed of rotation is gained by the provision of a friction brake whereby the liquid is prevented from breaking up as it issues from the nozzles. The revolutions of the nipples with respect to the assembly are made proportionately less in order to prevent breaking up of the jet of liquid into a spray. As a result, a solid stream of liquid issues from the nozzles and impinges upon the accumulations of material on the walls of the tank.

The invention is not limited to the specific details given by way of illustration and various changes may be made within the scope of the appended claim.

I claim:

A cleaner comprising a tube for conveying fluid, a distributing assembly for the fluid mounted for rotation axially of the tube and having fluid communication therewith, the assembly including discharge nipples rotatable about an axis at an angle to the axis of the tube, means operated by the nipples for rotating the assembly at a faster speed than the nipples, a member non-rotatably associated with the assembly and extending through the tube, and a friction brake including friction discs associated with the member and tube for controlling the speed of rotation of the assembly.

EDWARD MARLEY.